United States Patent [19]

Schroeder

[11] 4,334,181

[45] Jun. 8, 1982

[54] MOTOR BRAKE

[75] Inventor: Dale W. Schroeder, Iowa City, Iowa

[73] Assignee: Westinghouse Electric Corp., Pittsburgh, Pa.

[21] Appl. No.: 88,306

[22] Filed: Oct. 25, 1979

[51] Int. Cl.³ .............................................. H02P 3/24
[52] U.S. Cl. .................................. 318/762; 318/760; 318/798; 318/806; 363/28
[58] Field of Search .............. 318/762, 782, 798, 760, 318/757, 806; 361/23, 28, 33

[56] References Cited

U.S. PATENT DOCUMENTS

| 2,539,468 | 1/1951 | Pihl | 318/762 |
| 2,791,735 | 5/1957 | Norman | 318/762 |
| 2,854,613 | 9/1958 | Mowery, Jr. | 318/762 |
| 2,929,977 | 3/1960 | Choudhury | 318/762 |
| 3,753,061 | 8/1973 | Owens | 318/762 |
| 4,021,700 | 5/1977 | Ellis-Anwyl | 361/28 |
| 4,027,202 | 5/1977 | Tyler et al. | 361/33 |
| 4,181,197 | 1/1980 | Tanabe et al. | 318/762 |

Primary Examiner—David Smith, Jr.
Attorney, Agent, or Firm—M. P. Lynch

[57] ABSTRACT

The braking of an a.c. motor is accomplished by sequence controlled outputs of a shift register circuit which sequentially disconnects the main a.c. electrical excitation from the a.c. motor, connects a full wave rectifier circuit to the a.c. motor and then applies the a.c. electrical excitation to the full wave rectifier circuit resulting in a braking current being supplied to the a.c. motor.

2 Claims, 2 Drawing Figures

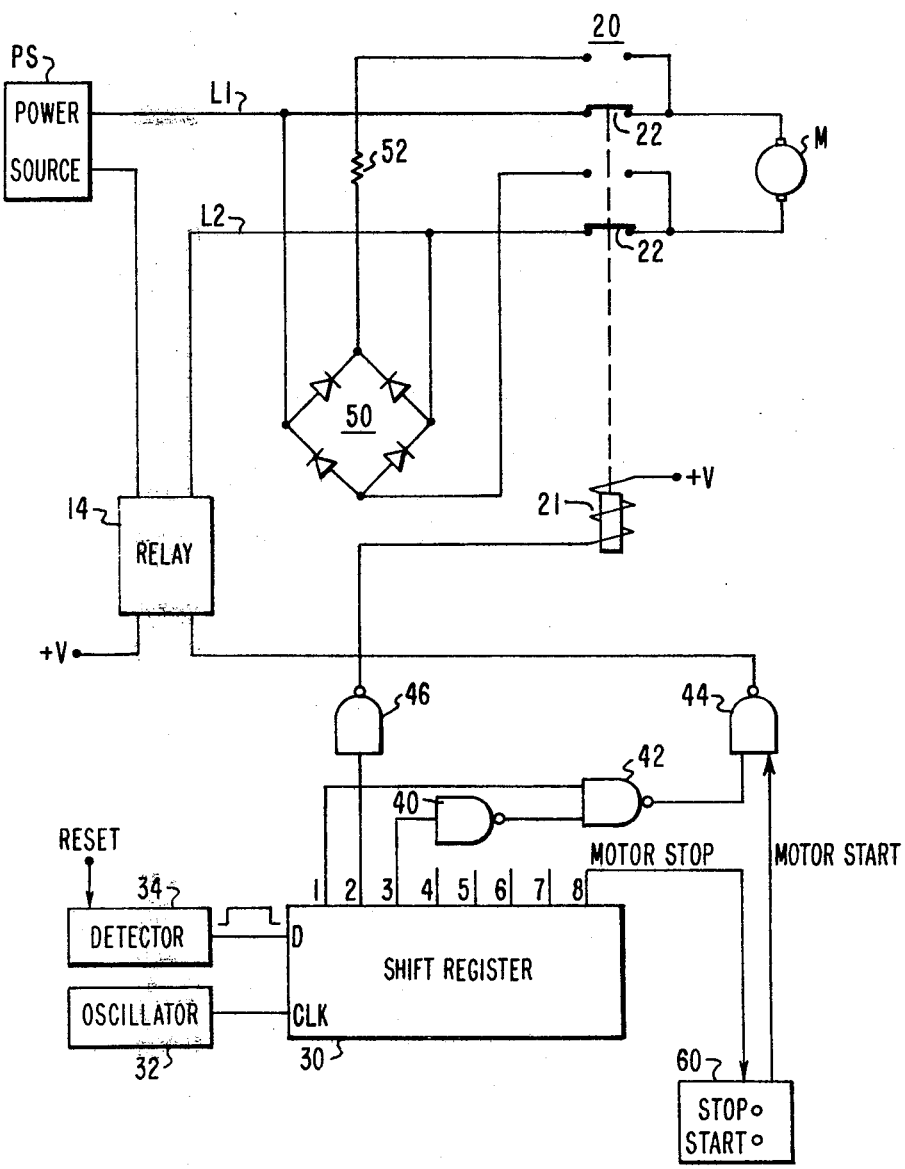
FIG. I

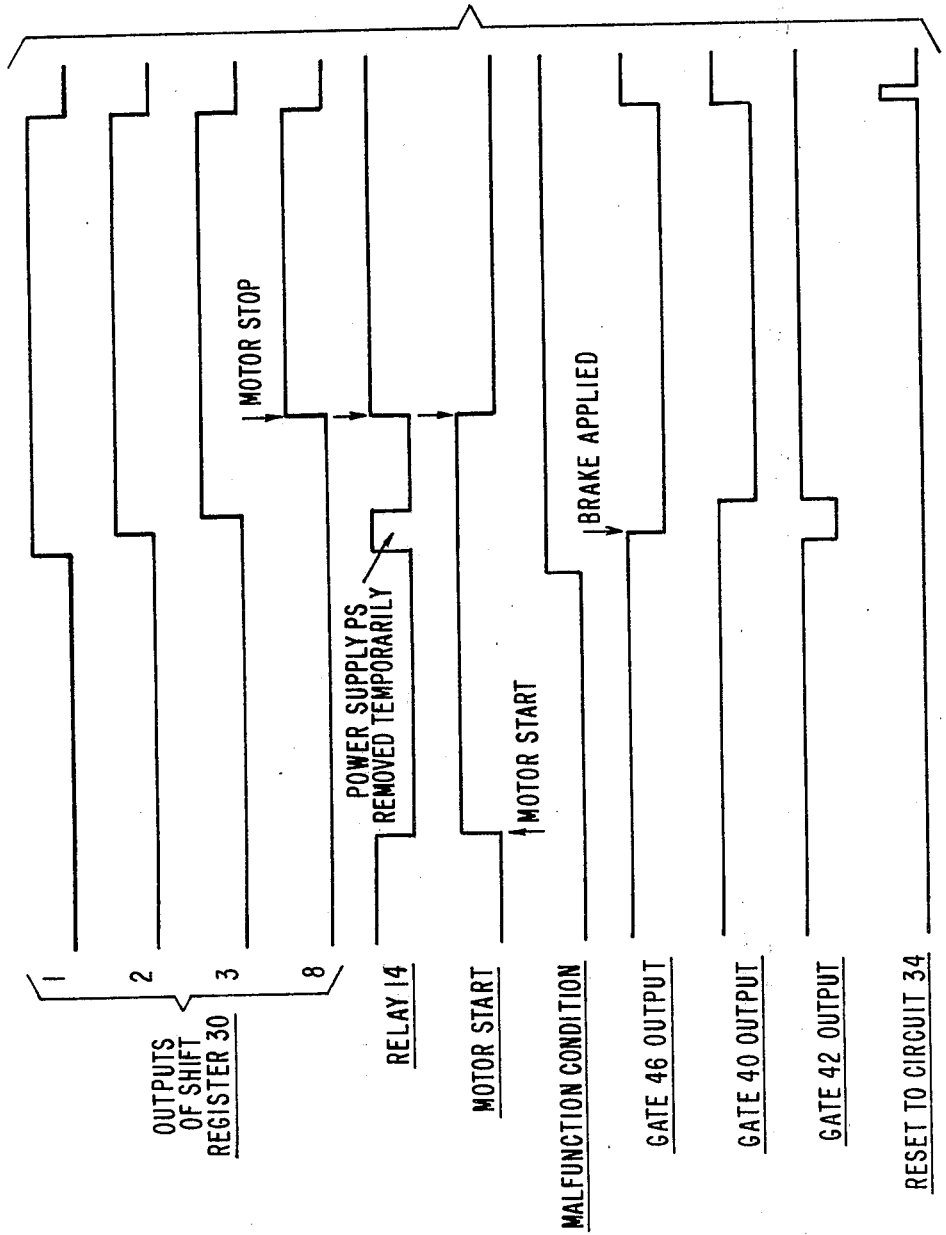

MOTOR BRAKE

BACKGROUND OF THE INVENTION

An essential control circuit in any motor driven apparatus is the motor brake control circuit which is responsible for disconnecting or braking the motor in the event of a system malfunction.

A typical example of such a requirement is that of a document processing apparatus wherein a motor driven transport is used to move documents through an optical scanning or reading system in order to extract information from the documents. In the event of a malfunction, such as a document jam condition, it is essential that the motor be disconnected to stop the movement of documents through the system. Typically motor braking systems, which are employed to prevent equipment damage or operator injury as a result of a system malfunction, employ a combination of mechanical and electrical brakes which require precision adjustment and independent power excitation. A typical mechanical/electrical braking system significantly increases the complexity and cost of the motor driven system.

The invention disclosed herein avoids the necessity for the conventional mechanical/electrical brake system by utilizing a standard AC induction motor without detracting from its normal motor operation.

SUMMARY OF THE INVENTION

In the invention described and illustrated in connection with the accompanying drawings the power excitation to the system motor is removed in response to a system malfunction and a secondary voltage source supplies a current to the motor to stop the motor rotation. A motor stop signal is then generated which removes the braking current and the motor is then in a condition to be reenergized following correction of the system malfunction.

DESCRIPTION OF THE DRAWING

The invention will become more readily apparent from the following exemplary description in connection with the accompanying drawings in which:

FIG. 1 is a schematic illustration of a preferred embodiment of the invention; and FIG. 2 is a timing diagram for the operation of the embodiment of FIG. 1.

DESCRIPTION OF THE PREFERRED EMBODIMENT

Referring to FIG. 1 there is schematically illustrated a motor brake system 10 employed in combination with an AC induction motor M which receives electrical excitation from an AC power source PS via relays 14 and 20. Motor ON/OFF is operator controlled by the momentary stop and start switches of a flip-flop type switching circuit 60. Under normal operating conditions all outputs of the shift register 30 are logic ZEROS. Under initial conditions relay 14 is deenergized and the motor M is stationary. The output of gate 44 is a logic ONE, due to the logic ZERO state of the motor ON line derived from circuit 60. The output of gate 42 is a logic ONE. Upon actuation of switch START the motor ON output changes to a logic ONE changing the state of gate 44 to a logic ZERO and energizing relay 14. Under these conditions the motor excitation is supplied from the power source PS through relay 14 and relay 20 to the motor M. The relay contacts 22 of the relay 20 are shown in the deenergized state of relay 20.

The control of the motor brake system 10 is effected by the shift register 30 which is driven by a clock input from a conventional oscillator circuit 32. The timing diagram for this control operation is illustrated in FIG. 2. The shift register 30 responds to a system malfunction input signal D from a detector 34 by causing logic ONES to be shifted sequentially through the stages of the shift register 30 in response to the clock input from the oscillator circuit 32. The shift register 30 may be typically implemented through the use of an 8-stage shift register type 74164. The detector 34, which may typically be implemented through the use of a latch circuit, sustains the input signal D until the malfunction, i.e., a document jam, is cleared and the detector 34 is reset. Assuming a malfunction has occurred, a logic ONE output at the first output stage 1 of the shift register 30 is applied as an input to the NAND gate 42. The NAND gate 42 responds to the logic ONE output from the first stage of the shift register 30 and from the NAND gate 40 by producing a logic ZERO and forcing the output of NAND gate 44 to logic ONE. The logic ONE output of NAND gate 44 deactivates relay 14 temporarily and disconnects the power source PS from the motor M. As the clock input from the oscillator circuit 32 advances the logic ONE's resulting in logic ONE outputs from both the first output stage 1 and the second output stage 2. The logic ZERO output of the inverter 46 energizes relay 20 causing relay contacts 22 to connect the bridge circuit 50 to the motor M. At the next clock pulse a logic ONE output from output 3 of the shift register 30 results in a ZERO logic output from NAND gate 44 which activates relay 14 thereby connecting the power source PS this time across the full wave rectifier bridge circuit 50. The application of excitation potential to the bridge circuit 50 by the power source PS results in the application of a braking current through resistor 52 and the contacts of relay 20 to the motor M. The braking current thus produced brings the rotation of the motor M to a complete stop. The abruptness of the termination of rotation of the motor M is a function of the level of braking current supplied to the motor M and this current level is controlled by the resistance value of the resistor 52. This condition remains until a logic ONE output appears at output 8 of the shift register 30. The logic output from output 8 of the shift register 30 is applied as a Motor Stop signal to the flip-flop circuit 60 with circuit 60 going to logic ZERO and causing the output of the NAND gate 44 to deenergize relay 14 and remove the power source PS from the bridge circuit 50.

This condition remains until the malfunction is identified and corrected at which time the detector 34 can be reset and the outputs of the shift register return to logic ZEROS. Under these conditions the relay contacts 22 of relay 20 return to the original state as illustrated in FIG. 1. Further, a logic ONE will be present at the output of NAND gate 42 thus providing an enabling input to gate 44. The next ZERO operation of the start switch of the circuit 60 will result in a logic ZERO output of NAND gate 44 and the activation of relay 14 and the resulting application of electrical excitation from the power source PS to the motor M.

I claim:

1. In a system or apparatus including an a.c. system motor connected to a principal a.c. electrical excitation source, the combination of, detector means for detecting a system malfunction and generating an output signal indicative thereof, braking circuit means, including a secondary power source means, responding to said output signal of said detector means by transferring the excitation of the a.c. system motor from the principal a.c. electrical excitation source to said secondary power source means to bring the a.c. system motor to a controlled stop in the event of a system malfunction, said secondary power source means including circuit means for applying a predetermined level of braking current to said a.c. system motor, and sequencing means operatively connected to said detector means, said principal a.c. electrical excitation source and said braking circuit means to generate a series of output conditions to sequentially disconnect said principal a.c. electrical excitation source from said a.c. system motor and subsequently connect said secondary power source means to said a.c. system motor in response to an output signal from said detector means, said sequencing means including a multistage output shift register means and logic circuit means connected to said output to develop said series of output conditions, the output of said detector means being the input to said shift register means.

2. In a system as claimed in claim 1 wherein said secondary power source comprises:

a full wave rectifier circuit having input terminals and output terminals, said input terminals being connected to said principal a.c. excitation source, a first switching means for disconnecting said principal a.c. excitation source from said a.c. system motor in response to a first output condition from said multistage output shift register means, a second switching means for connecting the output terminals of said full wave rectifier circuit to said system motor in response to a second output condition of said multistage output shift register means, said multistage output shift register means subsequently generating a third output condition causing said first switching means to connect said principal a.c. excitation source to the input terminals of said full wave rectifier circuit, said full wave rectifier circuit supplying a braking current to said system motor to bring said system motor to a complete stop.

* * * * *